US006727983B2

(12) United States Patent
Thallner

(10) Patent No.: US 6,727,983 B2
(45) Date of Patent: Apr. 27, 2004

(54) ADJUSTMENT TABLE

(76) Inventor: Erich Thallner, Bubing 71, 4780 Schärding (AT)

( * ) Notice: Subject to any disclaimer, the term of this patent is extended or adjusted under 35 U.S.C. 154(b) by 24 days.

(21) Appl. No.: 10/156,251

(22) Filed: May 28, 2002

(65) Prior Publication Data

US 2003/0058427 A1 Mar. 27, 2003

(30) Foreign Application Priority Data

Jun. 13, 2001 (DE) .......................................... 101 28 713

(51) Int. Cl.[7] .................................................. G03B 27/58
(52) U.S. Cl. ............................................................ 355/72
(58) Field of Search .............................. 355/53, 72, 73, 355/74, 75, 91, 93; 356/399, 400, 401; 310/12; 378/34

(56) References Cited

U.S. PATENT DOCUMENTS 5,471,279 A * 11/1995 Takizawa ..................... 355/73
5,477,304 A * 12/1995 Nishi .......................... 355/53
5,825,463 A * 10/1998 Hara et al. .................... 355/75
5,905,566 A * 5/1999 Comulada et al. ............ 355/73

* cited by examiner

*Primary Examiner*—Alan Mathews
(74) *Attorney, Agent, or Firm*—Mark Kusner; Michael A. Jaffe

(57) ABSTRACT

An adjustment table for aligning a body in a horizontal plane. The adjustable table includes an external frame, an intermediate frame moveable in a first horizontal direction in the external frame along a first path, and a holding unit for the body movable in a second horizontal direction that is perpendicular to the first horizontal direction in the intermediate frame along a second path. The intermediate frame can be positioned according to the external frame via a first adjustable device pivoted/hinged to the intermediate frame at a freely definable position along the first path. The holding unit can be positioned according to the intermediate frame via a second adjustment device pivoted/hinged to the holding unit at a freely definable position along the second path.

11 Claims, 1 Drawing Sheet

ADJUSTMENT TABLE

FIELD OF THE INVENTION

The invention concerns an adjustment table for aligning a body in a horizontal plane.

BACKGROUND OF THE INVENTION

When creating electrical structures (circuits) on semiconductor discs (wafers) using lithographic processes, it is necessary to position a wafer exactly in a horizontal level (orientation) relative to a mask. A similar problem is also faced during other processing techniques involved in manufacturing, processing or reworking of wafers.

While it is possible to control the alignment of a wafer in the X and Y direction within a plane using a microscope, there are severe design problems while fitting the wafer on a corresponding holding unit that allows the desired flexibility of movement in the X and Y direction and also ensures that the wafer is finally fixed in the corresponding final position.

The invention is supposed to bring to light such a possibility.

The invention is based on the following concept. A suitable adjustment table must have at least two movable parts that can be adjusted in at least two different directions (x, y). In this way, it is also possible to control any desired end position within the maximum displacement paths, if required with an angular displacement (turning). The movable parts should further be guided towards a stationary part, which helps in positioning the movable parts within a horizontal plane on one hand and creates a possibility of vertical adjustment for the entire equipment (the adjustment table) on the other.

The invention also is further based on the concept that the individual parts of the adjustment table should be more or less "encased in each other" so that the first movable part adjacent to the stationary part on the inner side can be moved in a horizontal direction and a second movable part arranged therein can be moved in horizontal direction perpendicular to it.

Here, the components movable in X and Y directions should geometrically match each other in such a way that each movable component can be moved in an exact linear line of movement in a horizontal plane.

Further, it is necessary to plan for equipment that fixes the movable parts in the desired final position.

SUMMARY OF THE INVENTION

The invention in its general form concerns an adjustment table for aligning a body, for example a wafer, in a horizontal plane, the adjustment table having the following characteristics:

- an external frame,
- an intermediate frame movable in a first horizontal direction (x) in the external frame along a first path ($X_{ges}$),
- a holding unit for the body movable in a second horizontal direction (y) that is perpendicular to the first horizontal direction (x) in the intermediate frame along a second path ($Y_{ges}$),
- an intermediate frame that can be positioned relative to the external frame via a first adjustment device pivoted/hinged to the intermediate frame at a freely definable position along the first path ($X_{ges}$), and
- a holding unit that can be positioned relative to the intermediate frame via a second adjustment device pivoted/hinged to the holding unit at a freely definable position along the second path ($Y_{ges}$).

In other words, the external frame that is not movable in the horizontal plane supports an intermediate frame that can be moved along the entire length ($X_{ges}$) of the first path in the X direction.

The intermediate frame correspondingly supports a holding unit that can be moved across the entire length ($Y_{ges}$) of the second path within the intermediate frame. The path lengths of the first and second path can be the same, for example 5 mm. Such "interplay" is generally adequate for the given area of application for positioning the wafers in a suitable device, for example to position them opposite a corresponding mask.

With the help of the adjustment devices, the intermediate frame and holding unit can be fixed in desired positions along the first and second paths, depending on the application. Additionally, a section of the holding unit used for supporting the wafer can be arranged in the horizontal plane in such a way that it can be turned.

The intermediate frame can be arranged on a corresponding supporting surface of the external frame. Thus, the external frame can have a tongue on the inner side, on which the intermediate frame lies all along its periphery close to the border. One embodiment envisions the arrangement of sliding elements for improving the sliding properties between intermediate frame and external frame.

A similar arrangement can also be made between the intermediate frame and the holding unit.

According to one embodiment, the sliding elements have balls or ball casters that can be fitted in groove-like recesses of corresponding surface sections of parts that move relative to one another (external frame, intermediate frame; intermediate frame, holding unit). It goes without saying that the arrangement of the corresponding components is preferably done in such a way that the components that are to be moved in relation to one another are at a short distance from each other, in axes next to the sliding elements. The direction of movement (x or y direction) of the corresponding components can be supported by arranging and fashioning sliding elements.

Another embodiment provides for the movement of the intermediate frame along a base that connects peripheral protruding frame parts of the external frame. In this embodiment, which is also shown in the following figure, the external frame has the form of a "trough".

The base of the external frame will thus not only support the sliding elements of the intermediate frame, but also support the holding unit arranged within the intermediate frame.

A defined movement of the given components in X or Y direction is also possible by connecting the external frame and the intermediate frame with each other with springs. These should at least be movable in the direction of the first path. Likewise, the intermediate frame and the holding unit can be connected with each other with springs that at least move in the direction of the second path.

In the first mentioned embodiment, the springs can be mostly arranged perpendicular to the direction of the first path whereby they run in the same plane and are arranged in a space formed between the external frame and the intermediate frame.

Similarly, in the second embodiment, the springs can be mostly arranged perpendicular to the direction of the second path but in the same plane and are arranged in a space formed between the intermediate frame and the holding unit.

In order to support the desired movement in X and Y direction it is recommended that the external frame, intermediate frame and the holding unit be formed in such a way that they more or less show a rectangular external contour in the view.

The external edges of the component running in the direction of movement of the component and the corresponding surface sections of the adjacent components must guide in an exact linear manner. For this reason, they are generally formed in the shape of flat surfaces.

The component sides that run perpendicular to the direction of movement of the respective components can be designed in any desired manner. For example, these external sides can have an outwardly extending projection in the center, on which two springs are fitted that run in different directions from this projection at a distance from one another, the other end of each spring being connected to the corresponding component. This arrangement of two springs, each on opposite side of every movable component, supports the exact linear movement of the respective component in the X or Y direction. A more detailed description of this model is given below with the help of the drawings.

The projection can also be used for creating a fulcrum point for the adjustment device as will be described below in detail with the help of the drawings.

The adjustment device can comprise a motor or gear unit. The adjustment device that influences the intermediate frame (from the outside) can be fixed on one location, for example, on the external frame, whereas the adjustment device that influences the internal holding unit should be capable of being guided perpendicular to direction of movement of the holding unit and thereby of the intermediate frame. The device can be directly fixed on the intermediate frame. Another option is to arrange the device in a corresponding recess of the external frame, which allows the displacement of the adjustment device along with the intermediate frame.

Other features of this invention arise from the features of the sub-claims and other application documents. The following description of Figures also indicates the features of the invention that can be realized in every possible combination.

DETAILED DESCRIPTION OF PREFERRED EMBODIMENT

Figure 1:
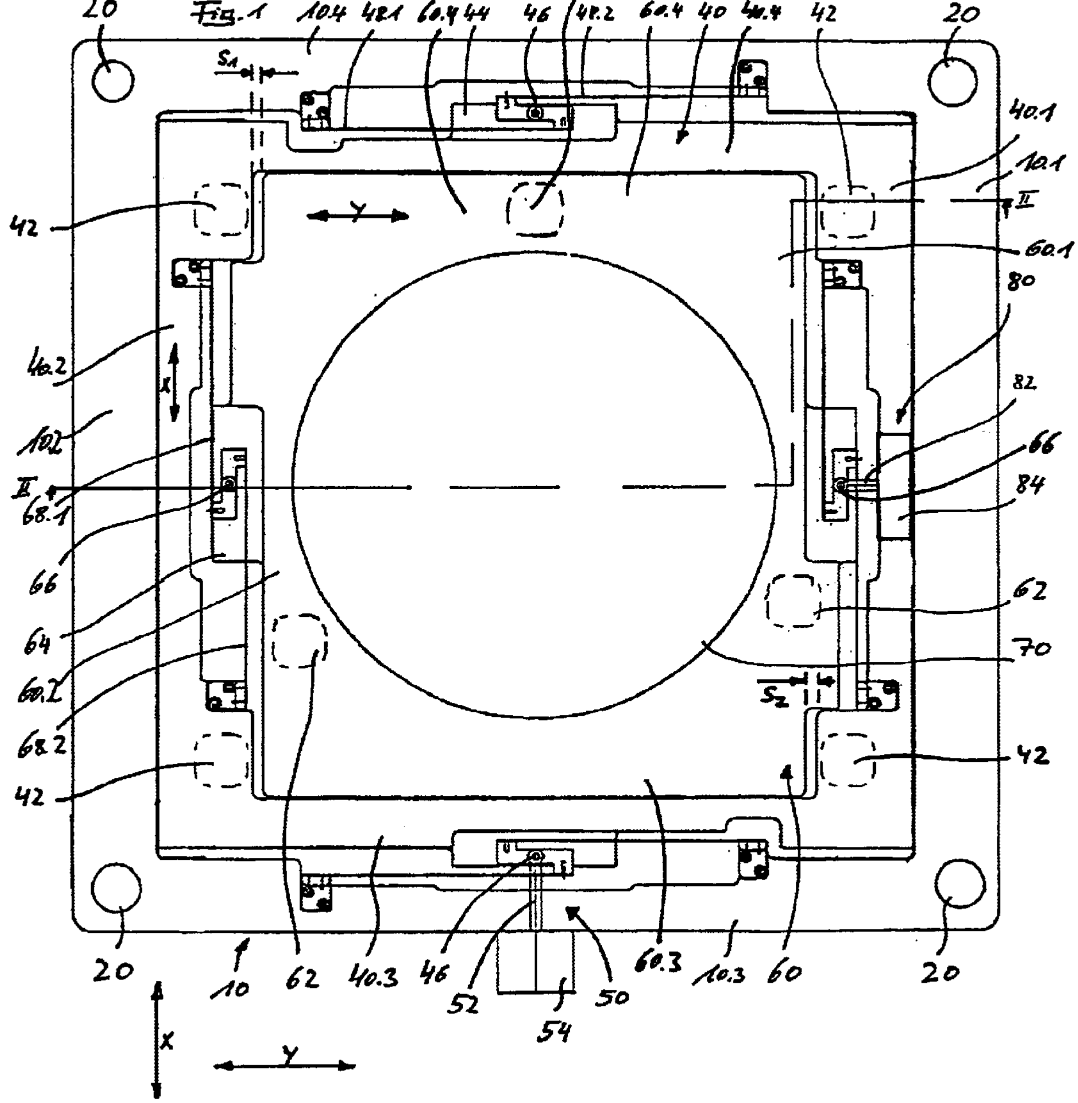
FIG. 1 is a detailed schematic representation of the invented adjustment table.

The adjustment table shown in FIG. 1 includes an external frame 10 with a quadratic external contour. Openings 20 can be seen in the corners. With the help of these openings 20, the adjustment table can be fitted on four pillars such that it can be moved in a vertical manner.

Figure 2:
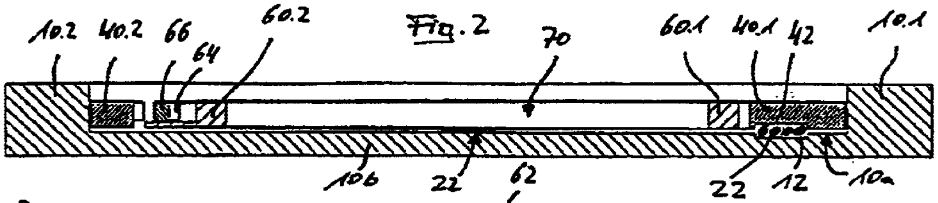
FIG. 2 shows a cross-section along line 2—2 in FIG. 1.

A combined view of FIGS. 1 and 2 shows that the external frame 10 has a base 10*b*, from where four intertwined flanks or sidewalls 10.1, 10.2, 10.3, 10.4 project upward. The base 10*b* can have openings.

Adjacent to the flanks 10.1 to 10.4, a corresponding circular support surface 10*a* is provided for for an intermediate frame 40.

As seen in FIG. 2, the structural height of the intermediate frame 40 is lesser than that of the external frame 10. As a result, the intermediate frame 40 lies somewhat recessed or sunk in the external frame.

The intermediate frame 40 is a “real frame.” Compared with the external frame 10, intermediate frame 40 does not have a central base.

Corresponding to the internal surfaces of the sidewalls or flanks 10.1, 10.2 of the external frame 10, flanks or sidewalls 40.1, 40.2 of the intermediate frame 40 are flat and in a straight line.

While the flanks 40.1, 40.2 run almost parallel to the flanks 10.1, 10.2 of the external frame without any play, all other frame sections such as 40.3, 40.4 of the intermediate frame 40 in the displayed position of the adjustment table are located at a distance from the adjacent corresponding flanks, for example 10.3, 10.4 of the external frame 10. The sum of these distances determines the maximum path $X_{ges}$, across which the intermediate frame 40 can be moved within the external frame 10 in the X direction.

The locations marked “42” each identify a recess (FIG. 2) on the lower side of the intermediate frame 40. Corresponding to it, there is another recess in the base 10*b* of the external frame that is identified with reference number “12” in FIG. 2.

In the region of these corresponding corrugated recesses 12, 42 there are bearings 22 which, according to this invention, form the sliding elements and enable the sliding movement of the intermediate frame 40 in the X direction vis-à-vis the external frame 10.

FIG. 1 shows that the sidewalls or flanks 40.3, 40.4 that are intertwined with the flanks 40.1, 40.2 show a projection 44 almost in the center pointing towards the external frame 10. Almost in the center of this projection 44 is a vertical bearing pin 46 pointing upwards (out of the drawing plane).

On projection 44 of the flank 40.4 are two flat springs 48.1, 48.2 that are fixed on one end to projection 44. From there they extend more or less parallel to flank 40.4 in the opposite direction (as shown in FIG. 1) and are fastened with their respective opposite ends on flank 10.4 of the external frame 10.

A corresponding structure is also seen for the region of the flank 40.3.

A spindle 52 extends from the bearing pin 46 perpendicular to the flank 40.3. This spindle is an integral part of an adjustment device 50. A motor 54, which is also an integral part of this device, is fixed on the external frame 10. The spindle can be started using the motor 54 whereby the intermediate frame 40 is moved in the X direction parallel to starting the spindle 50.

The arrangement of the springs 48.1, 48.2 shown in the Figure is favorable for the exact linear movement of the intermediate frame 40 within the external frame 10 in X direction.

A connection similar to the one described as existing between the intermediate frame 40 and external frame 10 also exists for an internal holding unit 60 within the intermediate frame 40. But here the arrangement is displaced by 90° in order to create a direction of movement for the holding unit 60 in the Y direction, i.e. perpendicular to the X direction and within the intermediate frame 40.

The holding unit 60 shows a circular opening 70 in the center, for example, on which a wafer can be placed. Similarly, a plate rotatable on base 10 (for mounting the wafer) can be positioned in the opening 70 on base 10 and may be fixed in any desired position.

While the flanks or sidewalls 60.3, 60.4 adjacent to the flanks 40.3, 40.4 externally run straight and planar like the flanks 40.1, 40.2 of the intermediate frame 40, the connecting flanks 60.1, 60.2 have almost the same design as the flanks 40.3, 40.4 of the intermediate frame. This also applies to the projections 64, bearing pins 66 and springs 68.1, 68.2 that are a replica of the projections 44, bearing pins 46 and springs 48.1, 48.2 on the external frame 40. The corner areas of the holding unit 60 are cut out according to the geometry of the corresponding sections of the intermediate frame 40.

The springs 68.1, 68.2 run perpendicular to the springs 48.1, 48.2 according to the desired direction of movement.

The maximum path in Y direction for the holding unit 60 is determined by the interplay between the flanks 40.1, 60.1 and/or 40.2, 60.2 and is calculated as the sum of the distances S1 and S2 as shown in FIG. 1.

The holding unit 60 shows recesses 62 on its lower side similar to those of the intermediate frame 40 that are located above the corresponding additional recesses (not shown in the Figure) on the upper side 10*a* of the base 10*b* of the external frame 10. They together accommodate bearings (not shown in the Figure) that allow the movement of the holding unit 60 in the Y direction parallel to the flanks 40.3, 40.4 of the intermediate frame 40.

Contrary to the sliding bearing of the intermediate frame 40 in the external frame 10, there are only three such recesses 62 here and at an angle of 120° to one another.

The holding unit 60 is further acted upon within the intermediate frame 40 by an adjustment device that has the reference number 80 and is mostly formed in the same way as the adjustment device 50. A major difference to the adjustment device 50 lies in the fact that a corresponding spindle 82 is guided by pin 66 only up to a short distance to the flank 40.1 and from there it is led upward through a guide gear to a motor 84 fixed on the flank 40.1. This is necessary as the flank 40.1, as a component of the intermediate frame 40, can move itself in the X direction and that inspite of a parallel activation of spindle 82 and movement of the holding unit 60 in the Y direction.

Having described the invention, the following is claimed:

1. Adjustment table for aligning a body in a horizontal plane with the following features:

an external frame (10), an intermediate frame (40) movable in a first horizontal direction (x) in the external frame (10) along a first path ($X_{ges}$), and a holding unit (60) for the body movable in a second horizontal direction (y) that is perpendicular to the first horizontal direction (x) in the intermediate frame (40) along a second path ($Y_{ges}$), said intermediate frame (40) can be positioned according to the external frame (10) via a first adjustment device (50) pivoted/hinged to the intermediate frame (40) at a freely definable position along the first path ($X_{ges}$), and said holding unit (60) can be positioned according to the intermediate frame (40) via a second adjustment device pivoted/hinged to the holding unit (60) at a freely definable position along the second path ($Y_{ges}$).

2. Adjustment table according to claim 1 whereby sliding elements (22) are positioned between the intermediate frame (40) and a corresponding supporting surface (10*a*) of the external frame (10).

3. Adjustment table according to claim 1 whereby sliding elements (22) are positioned between the holding unit (60) and a corresponding supporting surface (10*a*) of the intermediate frame or the external frame (10).

4. Adjustment table according to claim 2 or 3 whereby the sliding elements (22) are balls or ball casters.

5. Adjustment table according to claim 1 whereby the intermediate frame (40) is movable along a base (10*b*) that connects protruding peripheral frame parts (10.1, 10.2, 10.3, 10.4) of the external frame (10).

6. Adjustment table according to claim 1 whereby the holding unit (60) is movable along a base (10*b*) that connects peripheral protruding frame parts (10.1, 10.2, 10.3, 10.4) of the external frame (10).

7. Adjustment table according to claim 1 whereby the external frame (10) and the intermediate frame (40) are connected by springs (48.1, 48.2) that are movable at least in the direction of the first path ($X_{ges}$).

8. Adjustment table according to claim 1 whereby the intermediate frame (40) and the holding unit (60) are connected by springs (68.1, 68.2) that are movable at least in the direction of the second path ($Y_{ges}$).

9. Adjustment table according to claim 7 whereby the springs (48.1, 48.2) are mostly perpendicular to the direction of the first path ($X_{ges}$) but run in the same plane and are arranged in a space formed between the external frame (10) and the intermediate frame (40).

10. Adjustment table according to claim 8 whereby the springs (68.1, 68.2) are arranged mostly perpendicular to the direction of the second path ($Y_{ges}$) but run in the same plane and in a space formed between the intermediate frame (40) and the holding unit (60).

11. Adjustment table according to claim 1 whereby the external frame (10), the intermediate frame (40) and the holding unit (60) show a rectangular external contour in the view.

* * * * *